United States Patent
Fischer et al.

(10) Patent No.: US 8,092,194 B2
(45) Date of Patent: Jan. 10, 2012

(54) SUPPORT OF A PUMP DRIVE WHEEL ON THE SIDE OF THE STARTING COMPONENT WITH AN OFF-AXIS PUMP ARRANGEMENT IN AN AUTOMATIC TRANSMISSION

(75) Inventors: Manfred Fischer, Kressbronn (DE);
Lothar Beigang, Kressbronn (DE);
Andreas Salm, Lindau (DE); Stephan Brussa, Langenargen (DE)

(73) Assignees: ZF Friedrichshafen AG,
Friedrichshafen (DE); Dr. Ing. H. C. F. Porsche Aktiengesellschaft, Stuttgart (DE)

( * ) Notice: Subject to any disclaimer, the term of this patent is extended or adjusted under 35 U.S.C. 154(b) by 482 days.

(21) Appl. No.: 12/440,493

(22) PCT Filed: Sep. 12, 2007

(86) PCT No.: PCT/EP2007/059581
§ 371 (c)(1),
(2), (4) Date: Mar. 9, 2009

(87) PCT Pub. No.: WO2008/031844
PCT Pub. Date: Mar. 20, 2008

(65) Prior Publication Data
US 2010/0014994 A1    Jan. 21, 2010

(30) Foreign Application Priority Data
Sep. 14, 2006  (DE) .................. 10 2006 043 047

(51) Int. Cl.
*F01B 23/08*  (2006.01)
(52) U.S. Cl. ............................. 417/321; 417/410.1
(58) Field of Classification Search .......... 417/321, 417/534, 413.1, 328, 410.1, 474, 89, 74, 417/89.16; 92/48, 98 R; 91/348
See application file for complete search history.

(56) References Cited

U.S. PATENT DOCUMENTS

| 5,474,428 A | 12/1995 | Kimura et al. |
| 2004/0211174 A1 | 10/2004 | Ohtsuki |
| 2005/0255954 A1 | 11/2005 | Ishikawa et al. |

FOREIGN PATENT DOCUMENTS

| DE | 4342233 A1 | 6/1994 |
| DE | 10 2005 027 610 A1 | 12/2005 |
| EP | 1 598 576 A1 | 11/2005 |

*Primary Examiner* — Joseph L Williams
(74) *Attorney, Agent, or Firm* — Davis & Bujold, P.L.L.C.

(57) ABSTRACT

A support for a pump drive wheel (4) on the clutch side of a pump with an off-axis pump arrangement in an automatic transmission, particularly in a dual clutch transmission, in which the pump drive wheel (4) is supported on the centering plate (7) of the pump (2).

8 Claims, 2 Drawing Sheets

SUPPORT OF A PUMP DRIVE WHEEL ON THE SIDE OF THE STARTING COMPONENT WITH AN OFF-AXIS PUMP ARRANGEMENT IN AN AUTOMATIC TRANSMISSION

This application is a National Stage completion of PCT/EP2007/059581 filed Sep. 12, 2007, which claims priority from German patent application serial no. 10 2006 043 047.6 filed Sep. 14, 2006.

FIELD OF THE INVENTION

The present invention relates to the support of a pump drive wheel on the side of the starting component with an off-axis pump arrangement in an automatic transmission, particularly in a dual clutch transmission.

BACKGROUND OF THE INVENTION

Automatic transmissions usually have mechanically driven pumps for hydraulically supplying components e.g. the shifting elements. In this instance, pumps are developed as in-line pumps (coaxial to their drive) or as off-axis pumps, depending on available installation space and design factors; with off-axis pumps, the pump is arranged parallel to the drive shaft of the transmission and is driven by means of a spur gear drive that compensates the axial offset, which in accordance with the state-of-the-art the spur gear drive is normally developed as a straight spur gear stage with a driving and a driven gear.

According to the state-of-the-art, the gear of the spur gear stage, on the side of the starting element or the clutch, fits onto the clutch hub by means of pressfit, where the other gear is arranged on the pump shaft. The deformation of the gear wheel on the clutch side as a result of the pressfit and the long tolerance chain between the clutch gear and the pump wheel across several components and housings has the disadvantage that it results in non-optimal tooth meshing on the spur gear stage and thus in severe gear noise.

In addition, the spur gears can be damaged during the installation of the clutch, since the teeth have to be inserted blind. Another factor is that in the arrangement described, the reactive forces which are created through clutch imbalances and/or distortions, resulting from the long tolerance chain between the gears are transmitted to the inside of the pump, which can result in increased wear of pump bushings and pump wheels.

SUMMARY OF THE INVENTION

The object of the present invention is to present a support of the pump drive wheel on the clutch side with an off-axis pump arrangement in an automatic transmission, particularly in a dual clutch transmission, by which the disadvantages mentioned known from state-of-the-art designs can be avoided.

A support of the pump drive wheel on the clutch side with an off-axis pump arrangement in an automatic transmission, particularly in a dual clutch transmission, is therefore proposed, in which the pump drive wheel on the clutch side is supported on the centering plate of the pump, which also forms the back plate of the pump and into which one of the two bushes for supporting the pump shaft is normally pressed.

In this instance, the torque transfer between the clutch and the pump drive wheel on the clutch side is done via a slotted clutch hub and one or several carrier fingers attached to the drive wheel on the clutch side. In this manner, reactive and disturbing forces are kept away from the gear and thus also from the pump; only the torque is transferred. Furthermore, the tolerance chain between the gear wheels and thus the variation of the axial distance is reduced, which has a positive influence on tooth meshing with respect to noise generation and durability. Advantageously, the pump drive wheel on the clutch side is also acoustically isolated from the clutch.

A further advantage of the concept as taught by the invention consists in that the pump drive wheels with the support as taught by the invention can be preassembled on the centering plate prior to clutch assembly, as a result of which the difficult insertion of the gear wheel into the mating gear which is already fitted on the clutch, is no longer necessary.

Within the scope of a further embodiment of the invention, the two spur gears can be actively connected with each other through a chain drive, which is made possible by the isolation of the axial movements of the clutch.

With the proposed support of the pump drive wheel on the centering plate as taught by the invention, the variable thermal expansion of the steel gear wheel in relation to the aluminum centering plate must be considered.

Since a friction bearing support, i.e. the isolation by means of a lubricating film is advantageous because of acoustic reasons, with direct support of the pump drive wheel on the centering plate or also with a steel sleeve pressed onto the centering plate, the bearing clearance between both parts would have varied excessively across the temperature range.

According to the invention, a sleeve of a material that has a lesser coefficient of linear expansion than the centering plate is pressed into an inside diameter of the centering plate, wherein the sleeve is shaped such that it once again concentrically surrounds the outside diameter of the centering plate at a certain distance to the outside contour of the centering plate. The gap between the sleeve and the outside diameter of the centering plate created in this instance is so designed that a gap of roughly equal size is maintained across the entire temperature range, depending upon the temperature.

The required gap (friction bearing gap) for the friction bearing support between the rotating pump drive wheel on the clutch side and the sleeve remains constant independent of temperature, due to thermal expansion isolation.

In the event that the centering plate is made from aluminum, as known from prior art, the sleeve is preferably designed as a steel sleeve.

BRIEF DESCRIPTION OF THE DRAWINGS

In the following, the invention is described in detail, using the exemplary figures enclosed, as follows.

DETAILED DESCRIPTION OF THE INVENTION

Figure 1:
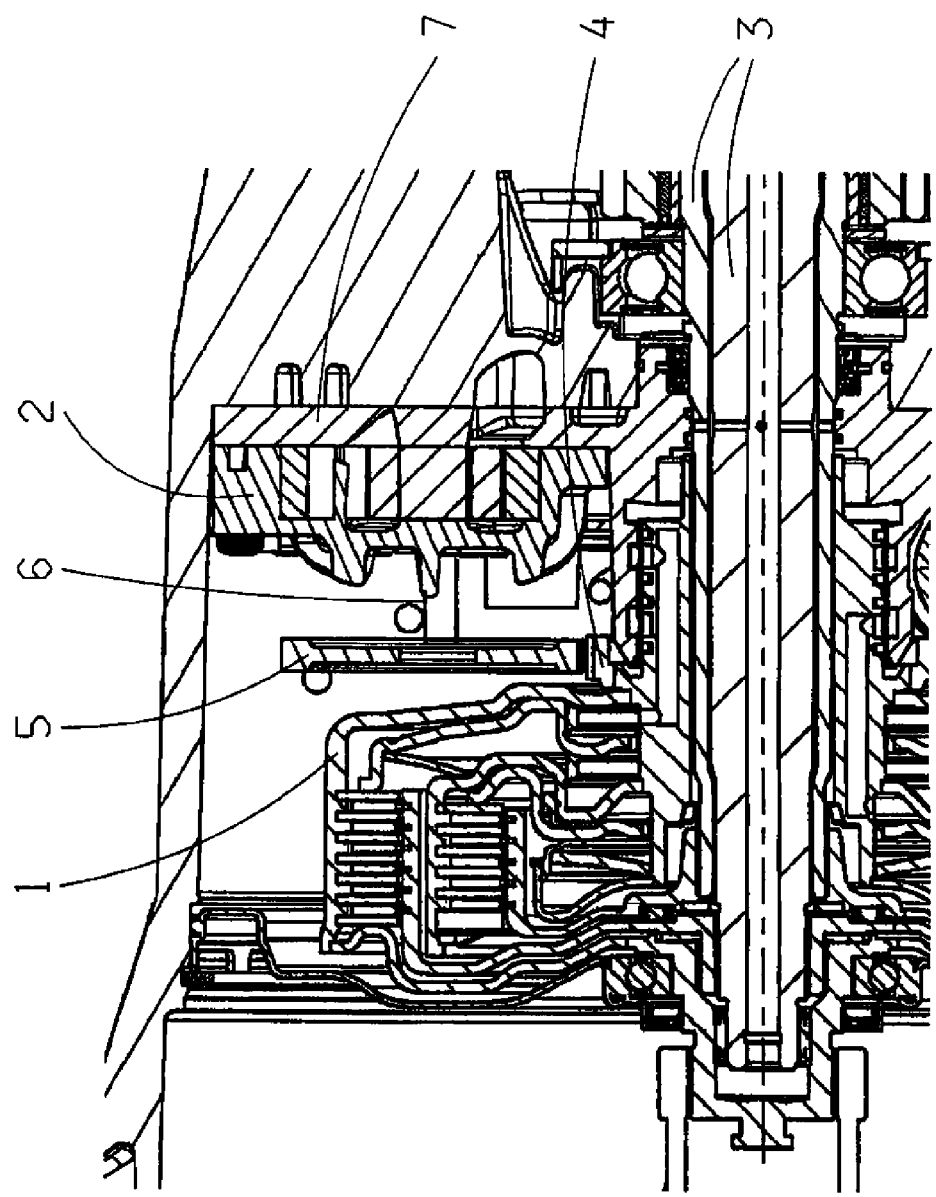
FIG. 1 is a schematic sectional view of the arrangement of the pump drive wheel on the clutch side with an off-axis pump arrangement according to state-of-the-art.

FIG. 1 shows the dual clutch 1 of a dual clutch transmission as well as pump 2, which is arranged parallel to the drive shaft 3 of the transmission and is driven by means of a spur gear drive, which compensates the axial offset, comprising a driving pump drive wheel 4 and a driven gear wheel 5 on the pump side. In this instance, the pump drive wheel 4 on the clutch side is arranged on the clutch hub by means of a press fit and/or shrink fit, wherein the wheel on the pump side is arranged on the pump shaft 6.

As explained previously, this arrangement does not result in optimal tooth meshing on the spur gear stage and thus produces severe gear noise. In order to solve this problem, according to the invention it is proposed to support the pump drive wheel 4 on the clutch side on the centering plate 7 of the pump 2 which also forms the back plate of the pump 2.

Figure 2A:
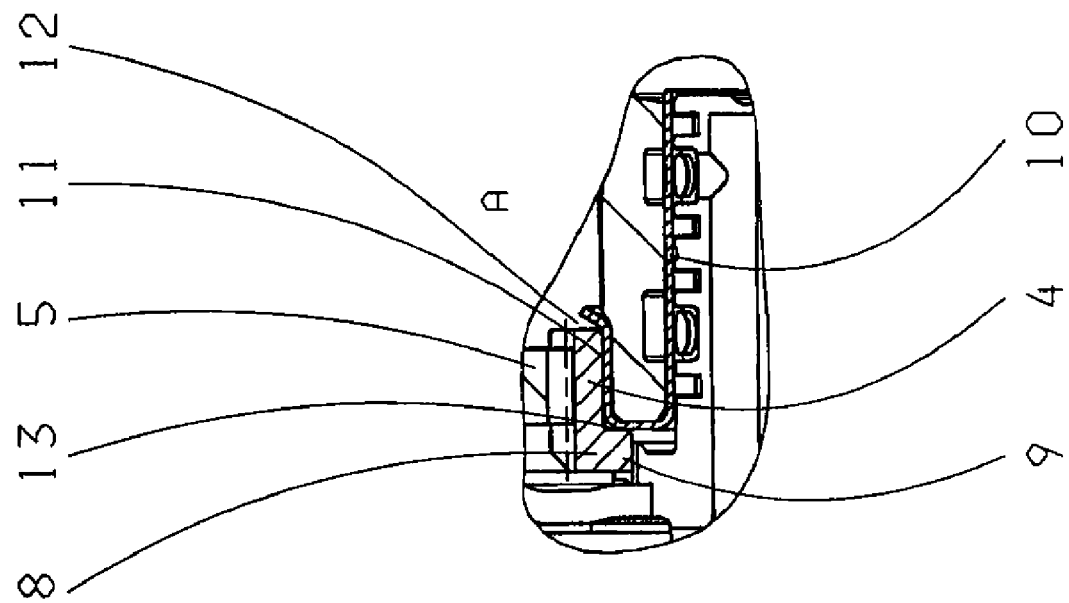
FIG. 2A is a detailed view of the components relevant for the invention.
Figure 2:
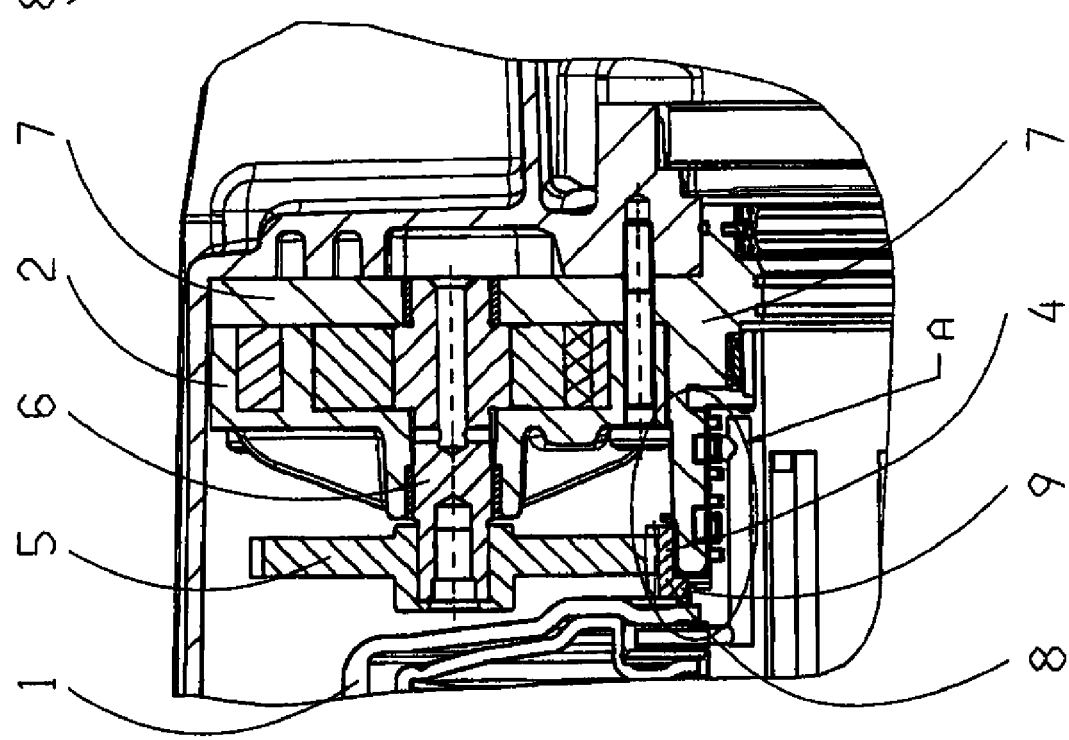
FIG. 2 is a schematic sectional view of the arrangement of the pump drive wheel on the clutch side with an off-axis pump arrangement according to the present invention.

A preferred embodiment of the invention is the subject of FIGS. 2 and 2A, wherein FIG. 2A is a detailed view of the area circled A in the left FIG. 2. As shown in FIG. 2, the pump drive wheel 4 on the clutch side is supported on the centering plate 7 of pump 2, wherein the torque is transferred between the clutch 1 and the pump drive wheel 4 on the clutch side via a slotted clutch hub 8, into which a carrier finger 9 attached on the pump driven gearwheel 5 on the clutch side engages. The support of the pump drive wheel 4 on the clutch side is preferably a friction bearing support, which is very advantageous for acoustic reasons.

As can be seen from FIG. 2A, a steel sleeve 10 is pressed into the inside diameter of the centering plate 7, which, according to state-of-the-art, is manufactured from aluminum, which is shaped such that it concentrically surrounds the outside diameter of the centering plate 7 at a certain distance to the outside contour of centering plate 7. The gap 11 between the sleeve 10 and the outside diameter of the centering plate 7 created in this instance is so designed that a gap of roughly equal size is maintained across the entire temperature range, depending upon the temperature. The required gap (friction bearing gap) 13 for the friction bearing support between the rotating pump drive wheel 4 on the clutch side and the sleeve 10 remains constant independent of temperature, due to thermal expansion isolation.

Within the scope of an advantageous development of the invention it is provided that the steel sleeve 10 is shaped on its end provided above the outside diameter of centering plate 7 such that an oil receiving chamfer 12 is created for the supply of additional lube oil to the sliding surface between the sleeve 10 and the pump drive wheel 4.

In place of the clutch, also another starting element, such as a hydrodynamic torque converter or an E-machine can be used.

Of course, any form of design development, particularly any spatial arrangement of components of the support as taught by the invention of the pump drive wheel on the clutch side in itself as well as in relation to each other and in so far technically sensible, fall within the scope of the present Claims, without affecting the support function of the pump wheel drive on the clutch side, as it is stated in the Claims, even if these developments are not explicitly represented in the figures or in the specification.

REFERENCE SYMBOLS

1 Clutch
2 Pump
3 Drive shaft
4 Pump driven wheel on the clutch side
5 Pump drive wheel on the pump side
6 Pump shaft
7 Centering plate
8 Hub
9 Carrier finger
10 Steel sleeve
11 Gap between the steel sleeve and the centering plate
12 Oil receiving chamfer
13 Friction bearing gap

The invention claimed is:

1. An arrangement of a pump in an automatic transmission, the pump being parallel axially shifted to a drive shaft and a clutch of the transmission, wherein the pump is drivable by a pump drive wheel on a clutch side and a driven gear wheel arranged on a pump shaft, and the pump drive wheel is supported on a centering plate, which forms a back plate of the pump.

2. The arrangement according to claim 1, wherein torque is transferred between the clutch and the pump drive wheel, on the clutch side, by a slotted clutch hub into which at least one carrier finger, attached on the pump drive wheel on the clutch side, engages.

3. The arrangement according to claim 1, wherein the support of the pump drive wheel on the clutch side is a friction bearing support.

4. The arrangement according to claim 3, wherein a sleeve is pressed into an inside diameter of the centering plate, the sleeve comprises a material which has a lower coefficient of linear expansion than that of the centering plate, the sleeve is shaped to surround concentrically an outside diameter of the centering plate at a certain distance to the outside diameter of the centering plate, such that a friction bearing gap, which is required for friction bearing support, between the pump drive wheel on the clutch side and the sleeve remains constant independent of temperature due to thermal temperature expansion isolation.

5. The arrangement according to claim 4, wherein a gap between the sleeve and the outside diameter of the centering plate is designed such that the friction bearing gap is maintained for a wide range of temperature.

6. The arrangement according to claim 4, wherein the sleeve is a steel sleeve and the centering plate is made of aluminum.

7. The arrangement according to claim 4, wherein an end of the sleeve above the outside diameter of the centering plate is shaped to form an oil receiving chamfer to supply additional lube oil to sliding surfaces between the sleeve and the pump drive wheel.

8. A pump for a dual clutch transmission, the pump comprising:
a pump drive shaft extending axially from the pump on a side of the pump closest to a double clutch of the dual clutch transmission and the pump drive shaft being axially parallel with a drive shaft of the dual clutch transmission and an extension of the double clutch;
a pump gear wheel being fixed to the pump drive shaft on the side of the pump closest to the double clutch;
a side of the pump, opposite to the side of the pump closest to the double clutch, being coupled to a centering plate such that the pump is rigidly supported;
a pump drive gear being driven by the double clutch and engaging the pump gear wheel to transmit drive from the double clutch to the pump, the pump drive gear being rotationally supported by an extension of the centering plate;
a sleeve overlaying the extension of the centering plate such that the sleeve is sandwiched between the projection of the double clutch and an inner diameter of the extension of the centering plate and between an outer diameter of the extension of the centering plate and an inner diameter of the pump drive gear.

* * * * *